United States Patent
Petkovsek

(10) Patent No.: US 7,493,292 B2
(45) Date of Patent: Feb. 17, 2009

(54) SYSTEM AND A METHOD FOR AUTOMATING DELIVERY OF COMMUNICATION BY A SPECIAL SERVICE

(76) Inventor: Glenn Petkovsek, 521 E. Markham St., Little Rock, AR (US) 72201

( * ) Notice: Subject to any disclaimer, the term of this patent is extended or adjusted under 35 U.S.C. 154(b) by 1608 days.

(21) Appl. No.: 09/784,479

(22) Filed: Feb. 15, 2001

(65) Prior Publication Data
US 2002/0111923 A1    Aug. 15, 2002

(51) Int. Cl.
*G06F 17/00* (2006.01)

(52) U.S. Cl. ........................................... 705/402

(58) Field of Classification Search ............. 715/517, 715/529, 506; 705/1, 26, 27, 39, 400, 401–411; 707/104.1, 10, 1
See application file for complete search history.

(56) References Cited

U.S. PATENT DOCUMENTS

| | | | |
|---|---|---|---|
| 4,595,984 A | 6/1986 | Daniels | |
| 5,566,230 A | 10/1996 | Cairo | |
| 5,809,116 A | 9/1998 | Cairo | |
| 5,815,555 A | 9/1998 | Cairo | |
| 6,178,413 B1 * | 1/2001 | Costin | 707/1 |
| 6,366,925 B1 * | 4/2002 | Meltzer et al. | 705/6 |
| 6,584,466 B1 * | 6/2003 | Serbinis et al. | 707/10 |
| 2001/0032178 A1 * | 10/2001 | Adams et al. | 705/38 |
| 2002/0019741 A1 * | 2/2002 | Heston | 705/1 |
| 2002/0046250 A1 * | 4/2002 | Nassiri | 709/206 |
| 2002/0049767 A1 * | 4/2002 | Bennett | 707/104.1 |
| 2002/0120680 A1 * | 8/2002 | Greco et al. | 709/203 |

FOREIGN PATENT DOCUMENTS

| | | | |
|---|---|---|---|
| EP | 1136915 A1 * | 9/2001 | |
| GB | 2247803 A * | 3/1992 | |
| GB | 2329500 A * | 3/1999 | |

OTHER PUBLICATIONS

Gowan, "Certified Mail Goes Digital," PCWORLD.COM, Copyright (c) 2001 PC World Communications, Inc. All rights reserved, PC World Communications, Inc. 501 Second St., San Francisco, CA 94107, USA.
Milazzo, "Certified Mail Website Nearing Online Debut," Bizjournals.com, 2000 © American City Business Journals Inc. All rights reserved.
"Venture Delivers First Online Certified Mail Solution," Venture-encoding.com, 2000.
"ACE Certified Mail System from Venture," Venture-encoding.com, 2000.
"CertifiedMail.com Launches New Internet E-mail Delivery Service," emailtoday.com, © GroupWeb.com 2000.

* cited by examiner

*Primary Examiner*—Igor N Borissov
(74) *Attorney, Agent, or Firm*—Patents + TMS, P.C.

(57) ABSTRACT

A system and a method for assisting in the process of generating mailing communications and satisfying their requirements are provided. The system and the method allow customers or users to interact on a computer network, such as the internet, with a database to generate a communication with minimal time or effort expended such that the communication complies with requirements for delivery of mail by a special service. The system and method inform users of requirements of special mailing needs to effectuate delivery of, for example, a legal letter, allows users automatic delivery of a mailing requiring a special service and provides automatic transfer of fees associated with postage and services rendered.

18 Claims, 4 Drawing Sheets

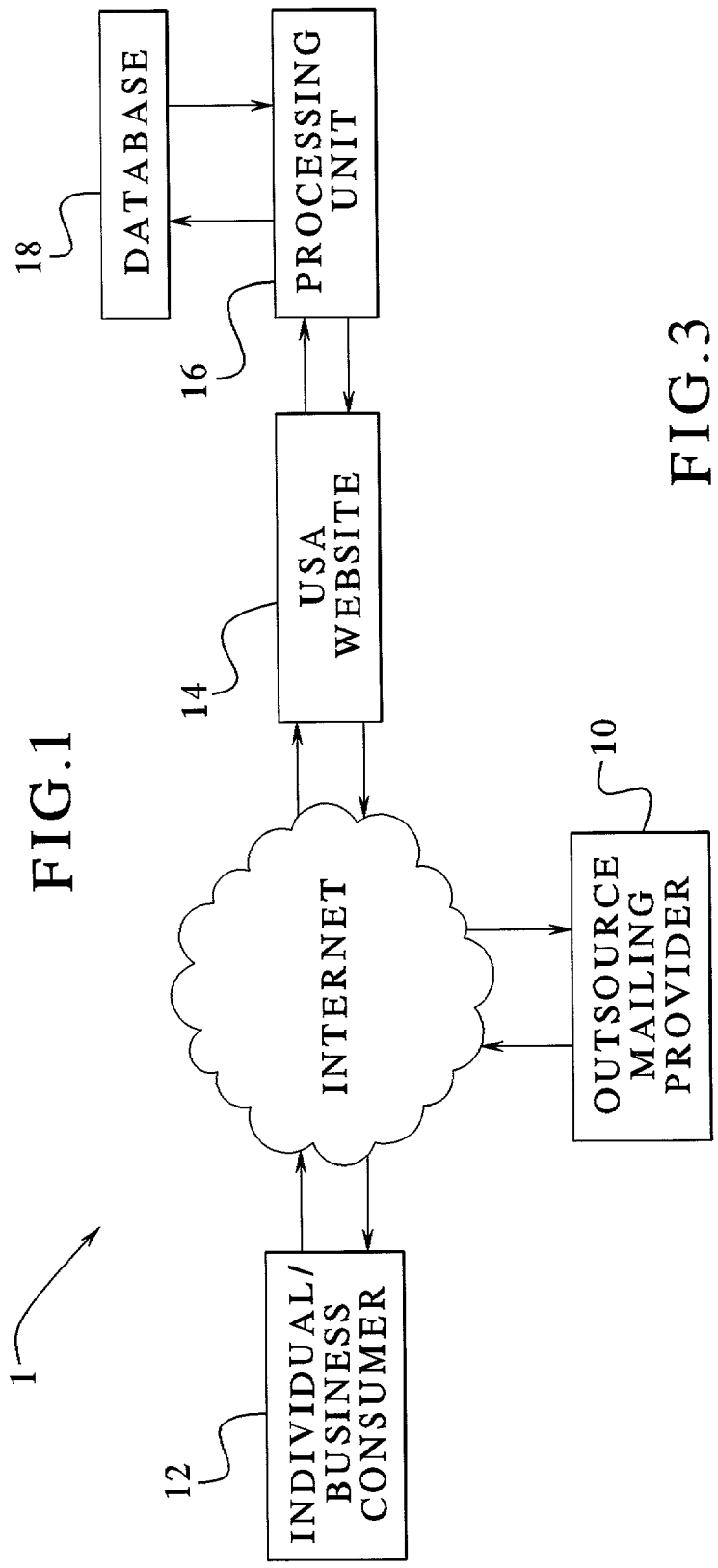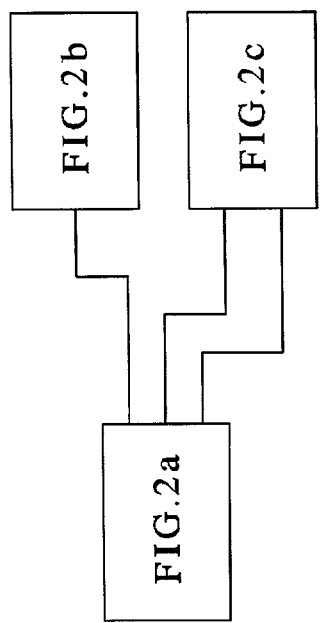

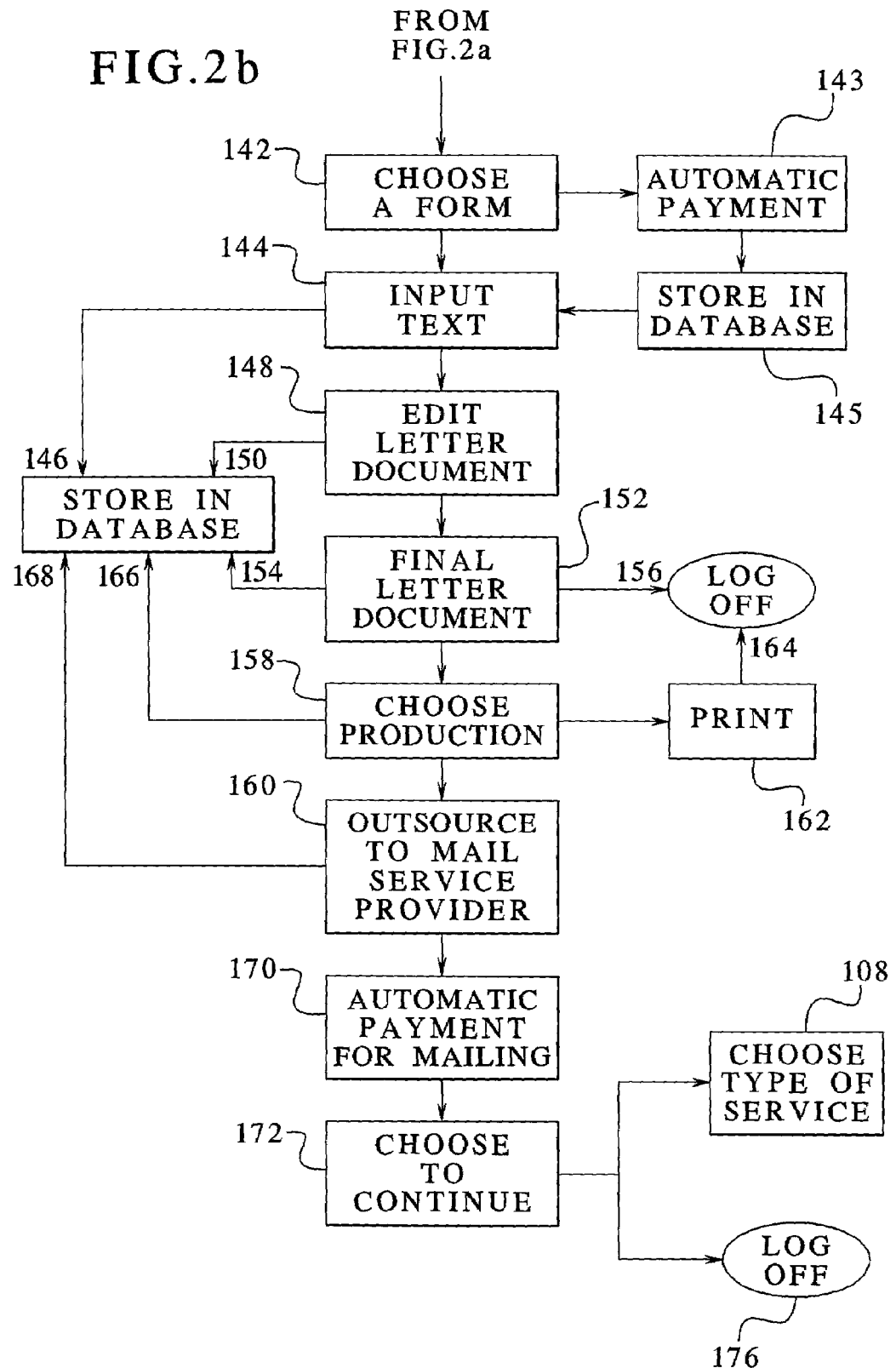

SYSTEM AND A METHOD FOR AUTOMATING DELIVERY OF COMMUNICATION BY A SPECIAL SERVICE

BACKGROUND OF THE INVENTION

The present invention generally relates to a system and a method for assisting in the process for generating and satisfying requirements for mailing communications such as, for example, a letter requiring delivery by a special service such as certified mail, registered mail, insured mail, return receipt for merchandise mail or the like. More specifically, the present invention relates to a system and a method from which customers may interact on a computer network, such as the internet, with a database to generate a communication that complies with requirements for delivery of mail by a special service.

It is, of course, generally known that individuals as well as businesses are using the internet as a resource for information. The use of the internet as a resource for information or other needed function has become widely accepted. Often individuals communicate, conduct research, shop, buy groceries, bank, and/or pay taxes via the internet. As the use of the internet becomes more pervasive, individuals become more dependent on the internet and turn to the internet to improve or conduct their personal and/or commercial business.

In a more relevant example, individuals as well as businesses at times are compelled to make communications of a legal nature. However, many individuals are not aware of special mailing requirements for certain legal letters. Moreover, individuals are often hesitant to consult attorneys for such information as the costs associated therewith are often prohibitive. Many businesses are required to staff individuals for the sole purpose of handling their mailing requirements. Managing special service mail, such as certified mail, is a costly and labor-intensive process. Using the internet to conduct a variety of business-related functions and as a less expensive alternative and/or resource has become a viable option for both individuals and businesses.

Currently, internet web sites offer legal forms, such as the website maintained by Badger Information Service. Further, web sites are known that offer services relating to preparation of mailpieces for delivery by a special service, such as the website maintained by USCertifiedLetters, LLC for sending one page certified letters or the website maintained by CertifiedMail.com for sending certified electronic mail. In addition, methods and systems are known for generating postage values for articles to be mailed including special fees applicable to the articles, such as certified mail. Such methods and systems are disclosed in U.S. Pat. Nos. 4,595,984; 4,325,440; and 4,286,325.

However, no systems or methods are known that inform users of requirements of special mailing needs to effectuate delivery of, for example, a legal letter. Moreover, no systems or methods are known that allow the user automatic delivery of a mailing requiring a special service and/or provides automatic transfer of fees associated with postage and services rendered.

A need, therefore, exists to provide a system and a method which addresses the problems associated with the preparation of communications, such as legal letters and their mailing requirements, via an easily accessible and widely used source, such as the internet.

SUMMARY OF THE INVENTION

The present invention provides a system and a method for assisting in the process of generating and satisfying requirements associated with delivery of a communication, for example, a legal letter such as a letter of eviction or notice of repossession, requiring delivery by a special service. More specifically, the present invention provides a system and a method from which individuals may interact on a computer network, such as the internet, with a database to properly mail a letter with minimal time or effort expended.

To this end, in an embodiment of the present invention, a system is provided to assist with preparation and automatic delivery of a communication by a special service. The system has a computer-accessible site that provides automatic processing of a mailing requiring delivery by a special service and automatic transfer of fees associated with postage and services associated with the delivery. The system has a database including information input from users. The information includes requirements to effectuate delivery by the special service.

In an embodiment, the system includes a means for inputting information by each of the users.

In an embodiment, the system includes a plurality of forms stored in the database wherein the users may choose any one of the plurality of forms.

In an embodiment, the system includes a directory of addresses stored in the database.

In an embodiment, the system includes a means for generating addresses necessary for delivery based on information input by the user.

In an embodiment, the system includes a means for generating communications based on the information input by the user.

In an embodiment, the system includes a means for suggesting mailing requirements based on information input by the user.

In an embodiment, the system includes a means for computing postage costs and fees to the user associated with delivery by the special service.

In an embodiment, the system includes a means for contacting a supplier necessary to complete delivery of the communication by the special service.

In an embodiment, the system includes a means for storing information input by the user and communications generated for the user.

In an embodiment, the system includes a means for generating a report for the user.

In another embodiment of the present invention, a method is provided for assisting with preparation and automatic delivery of communications requiring delivery by a special service. The method comprises the steps of: providing a computer-accessible site and providing a database of information wherein the database information is accessible by parties and includes information such as requirements to effectuate delivery of a special mailing, forms, and addresses; inputting information into the database regarding demographics; selecting a type of communication by one of the users; automatically delivering an item by the special service; generating user fees, postage costs and special service mail provider costs and automatically transferring the fees associated with postage and services.

In an embodiment, the method further comprises the step of determining required services for delivery by the special service and costs associated with the delivery.

In an embodiment, the method further comprises the step of providing suggestions for complying with requests for delivery by the special service based on demographics input by the user and the type of communication chosen by the user.

In an embodiment, the method further comprises the step of generating the communication based on information input by the user.

In an embodiment, the method further comprises the step of providing the communication to the user via a display screen.

In an embodiment, the method further comprises the step of providing dates and times of steps taken by a special service mail provider in mailing the communication.

In an embodiment, the method further comprises the step of generating a report of actions taken by a special service mail provider.

It is, therefore, an advantage of the present invention to provide a system and a method for assisting in the process of generating a mailing communication.

Another advantage of the present invention is to provide a system and method to assist with the process of delivery of a communication that requires delivery by special mailing service.

Yet another advantage of the present invention is to provide a system and method that is a computer accessible site.

A further advantage of the present invention is to provide a system and method having a database of information relating to requirements of special mailing services, addresses, a plurality of mailing forms, and demographics of users.

A still further advantage of the present invention is to provide a system and method including a means for choosing a form from the database.

Moreover, an advantage of the present invention is to provide a system and method for automatic delivery of a communication by a special service.

Yet another advantage of the present invention is to provide a system and method for automatic transfer of fees associated with postage and services.

Another advantage of the present invention is to provide a system and method including suggestions for complying with requests for delivery by the special service based on demographics input by the user and the type of communication chosen by the user.

Moreover, another advantage of the present invention is to provide a system and method having a means for contacting a special mailing service provider.

And, another advantage of the present invention is to provide a system and method including a record of all mailing steps taken by the special service mailing supplier.

And, another advantage of the present invention is to provide a system and method including a means for storing information input by the user and/or special service provider and generating a report for the user.

Additional features and advantages of the present invention are described in, and will be apparent from, the detailed description of the presently preferred embodiments and from the drawings.

BRIEF DESCRIPTION OF THE DRAWINGS

FIG. 1 illustrates a black box diagram of an embodiment of the system of the present invention.

FIGS. 2a, 2b, and 2c illustrate a flowchart of components associated with the system and method in an embodiment of the present invention.

FIG. 3 illustrates a black box diagram of FIGS. 2a, 2b and 2c.

DETAILED DESCRIPTION OF THE PRESENTLY PREFERRED EMBODIMENTS

Figure 2A:
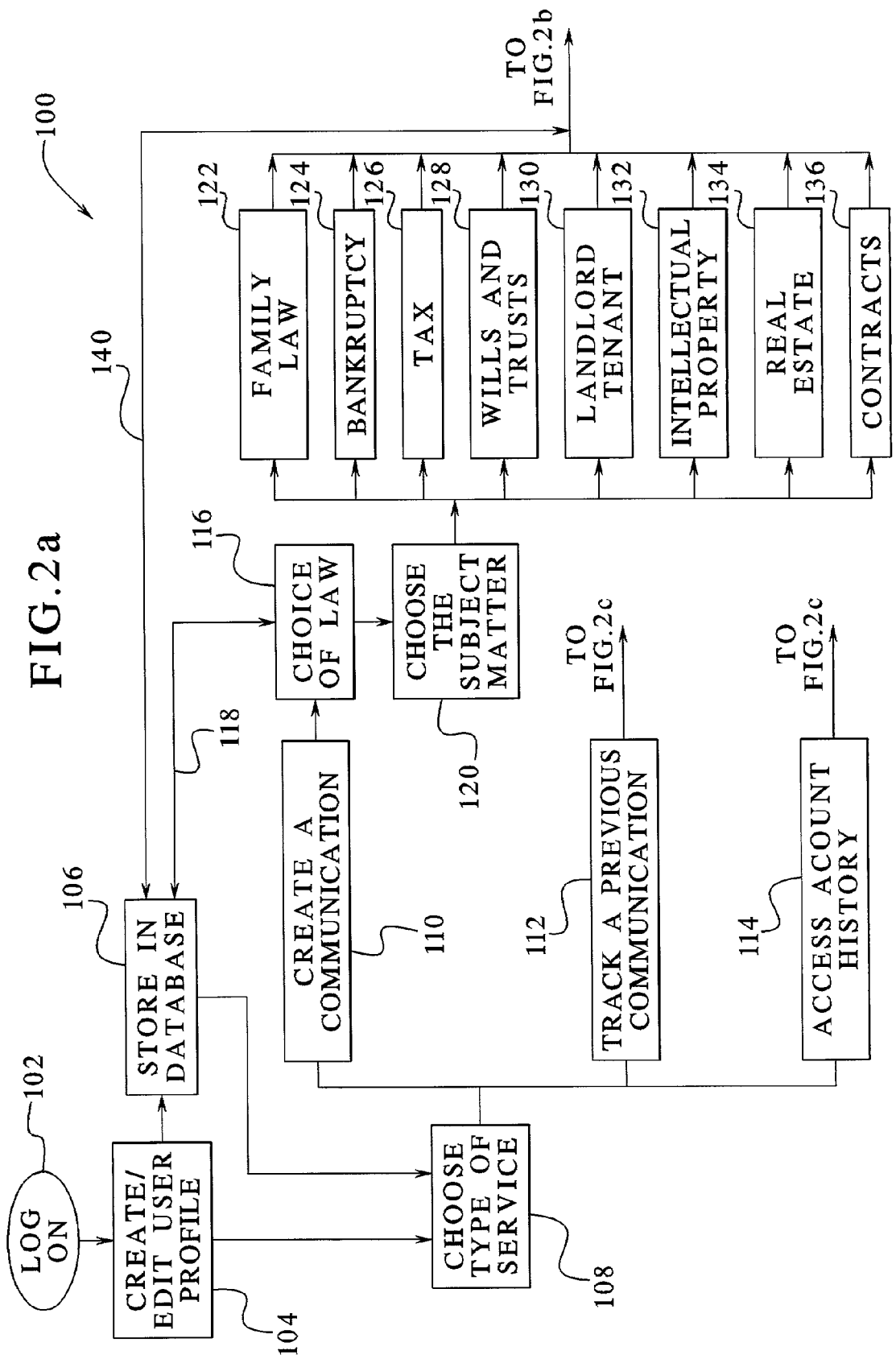

The present invention generally relates to a system and a method for providing assistance in the process of generating and complying with requirements for delivery of a communication by a special service, such as, for example, certified mail, registered mail, insured mail, return receipt for merchandise, or the like. In addition, the present invention relates to a system and a method from which individuals may interact on a computer network, such as the internet, to satisfy requirements necessary to generate and mail a communication requiring delivery by a special service with minimal time or effort expended.

For example, an individual such as a landlord may retrieve a form from which to prepare an eviction letter. The form may also provide mailing instructions, such as whether, for legal reasons, certified mail may be required, for example. The landlord may then utilize a special service mail provider to automatically send the landlord's generated legal letter of eviction with delivery of the letter by any required special mailing services.

Referring now to the drawings, in FIG. 1, a system 1 of the present invention is generally illustrated. The system 1 includes a number of components acting as "players" who use the system 1 to generate and satisfy requirements necessary to send a communication for delivery by a special service, such as, for example, certified mail, registered mail, insured mail, or the like. One player may be the outsource mail service provider 10, which may be, for example, commercial or governmental mail service providers, such as United Parcel Service, Federal Express or the United States Post Office. Another player may be a user 12. The user 12 may be, for example, a business, a landlord, a physician, or any individual who seeks information regarding how to generate a letter or other communication and whether special service delivery of that communication may be required.

Both of these players, the mail service providers 10 and the users 12, may be connected by, for example, the internet through a website 14 accessible by a processing unit 16. A database 18 may provide the necessary information to simplify the generation of communications, such as legal letters, to inform the user 12 of the required special mailing services, to access the appropriate postage fees, and to perform tracking of mail for each of the players, namely the mail service providers 10 and/or the users 12. The mail service providers 10 and/or the users 12 may access the website 14 by, for example, computers, portable wireless access devices, cellular telephones with internet access or the like. Access to the website and/or the database also preferably provides access to the functions of the system 1.

The processing unit 16 may be designed as a search engine and may process information provided by the users 12, the mail service providers 10 and information provided by the database 18.

The database 18 may preferably be established as a series of databases having tables or the like including contact information of the user 12 or mail service provider 10, demographics of the user 12 and/or account information, address directory, laws, choice of law parameters, form letters and documents, and mail service provider information. The processing unit 16 and the database 18 may be designed with the underlying programming of the website 14 to include matching capabilities that receive input regarding demographics and subject matter to provide choice of law suggestions and letter or document forms to assist the user 12.

For example, the user 12 may input demographics and subject matter that identify the user 12 as a landlord of a single apartment located in Chicago, Ill. who wishes to evict a tenant for failure to pay rent. The processing unit 16, the database 18, and the website 14 through its software may be programmed to provide a legal letter form based on Illinois law for the eviction of tenants that fail to pay rent and may also provide special mailing instructions based on Illinois law. For example, that letter may require delivery by registered mail and confirmation of receipt at least thirty days prior to eviction. Further, the processing unit 16, the database 18, and the website 14 through its software may be programmed to automatically provide postage values and special mailing services fees.

Of course, various databases may be established for the users 12 and the mail service providers 10. For example, the users 12 and the mail service providers 10 may have a database to verify addresses.

The website 14 may be split into more than one website to choose between different services, namely the generation and proper mailing of a communication, the tracking of a communication previously sent, or the current account, payment history, and general use history of any specific user 12. A second website may be established for the mail service provider 10 to manage the information received from the users 12 regarding the status of items sent, such as the special mailing services used, addressee, delivery date, who signed for delivery, etc. The mail service providers 10 may also post messages to immediately notify the users 12 of any problems associated with delivery.

FIG. 2a illustrates a flowchart 100 showing how the user 12 may access the website 14 and/or use the features of the website 14. The user 12 may access the website 14 via the "log on" step 102. Access may be achieved remotely via the internet, for example.

After the user 12 has accessed the website 14, the user 12 may create or may edit a user profile as shown at step 104. The user profile may be used to keep an accounting of the user 12 for billing purposes or other like purposes. The user profile may then be stored in the database 18 as shown at step 106. The user 12 may then proceed to choose, for example, a type of service as shown at step 108.

If the user profile has previously been created and does not require editing, the user 12 may skip step 104 and proceed directly to step 108. However, the user 12 may choose to edit his address or other such information at any time.

Step 108 may allow a user 12 to choose to "create a communication" as shown at step 110, "track a previous communication" as shown at step 112, or "access account history" as shown at step 114. If, for example, the user 12 chooses to "create a communication" at step 110, the user 12 may proceed to input additional information for the "choice of law" at step 116. In a preferred embodiment, the "choice of law" at step 116 as well as the user profile stored in the database 18 at step 106 may be used to aid the user 12 in the selection of the appropriate relevant state law. Therefore, the "choice of law" as shown at step 116 may contain a questionnaire asking the user 12 a plurality of questions to determine the appropriate jurisdiction at issue, for example. The choice of law information may then be stored in the database 18 as shown at step 118.

The user 12 may then proceed to "choose the subject matter" as shown in FIG. 2b at step 120 for the communication the user 12 is attempting to generate. At step 120, the user 12 may choose subject matter, for example, "family law" as shown at step 122, "Bankruptcy" as shown at step 124, "tax" as shown at step 126, "wills and trusts" as shown at step 128, "landlord/tenant" as shown at step 130, "intellectual property" as shown at step 132, "real estate" as shown at step 134, "contracts" as shown at step 136, or any one of a plurality of legal subject matter. The subject matter information may then be stored in the database 18 as shown at step 140.

After the user 12 chooses a subject matter, the website 14 may search the database 18 for forms of legal letters or documents based on the choice of law and subject matter information input by the user 12. The information retrieved from the database 18 may be compiled and a list of appropriate forms may then be presented to the user 12.

The user 12 may then proceed to "choose a form" from the list of legal letters and documents as shown at step 142. After choosing any one of the plurality of forms presented, the user 12 may automatically be charged the appropriate fee via "automatic payment" as shown at step 143. This information may be sent to database 18 as shown at step 145. The user 12 may then be prompted to input addresses and whatever text may be required for the chosen form as shown at "input text" step 144. The address input may be stored in the database 18 as shown at step 146. After the user 12 enters the appropriate text as shown at step 144, the website 14 may search the database 18 to verify addresses or retrieve a suggested address if incorrect or only partial address information was entered by the user 12. The processing unit 16 (shown in FIG. 1) may compile the information retrieved from the database 18 and other text input by the user 12 and generate the sought after legal letter or document for the user 12.

The user 12 may then proceed to edit the presented legal letter or document as shown at an "Edit letter/document" step 148. Any address modifications made by user 12 at step 148 may be stored in the database 18 for future reference as shown at step 150.

The user 12 may then proceed to either accept or abandon the edited legal letter or document as shown at "final document" step 152. An accepted final document may be sent to the database 18 for future reference as shown at step 154. An abandoned final document may trigger a prompt for the user 12 to log off as shown at step 156.

If the user 12 accepts the final document, the user 12 may proceed to "choose production" as shown at step 158 to choose to either "outsource to a mail service provider" as shown at step 160 or to "print" the final document as shown at step 162. If the user 12 chooses to print the final document, the user 12 may then proceed to log off as shown at step 164, The final document may be sent to the database 18 for future reference as shown at step 168. If the user 12 chooses to use the mail service provider 10, information from the mail service provider 10 may be sent to the database 18 as shown at step 166.

The user 12 may then be automatically charged for the computed postage for the document to be sent and for special service fees in addition to fees associated with the mail service provider 10.

The user 12 may then proceed to "choose to continue" as shown at step 172. The user 12 may choose not to continue and "log off" as shown at step 176 or may choose to continue and return to "choose a type of service" as shown at step 174.

Figure 2C:
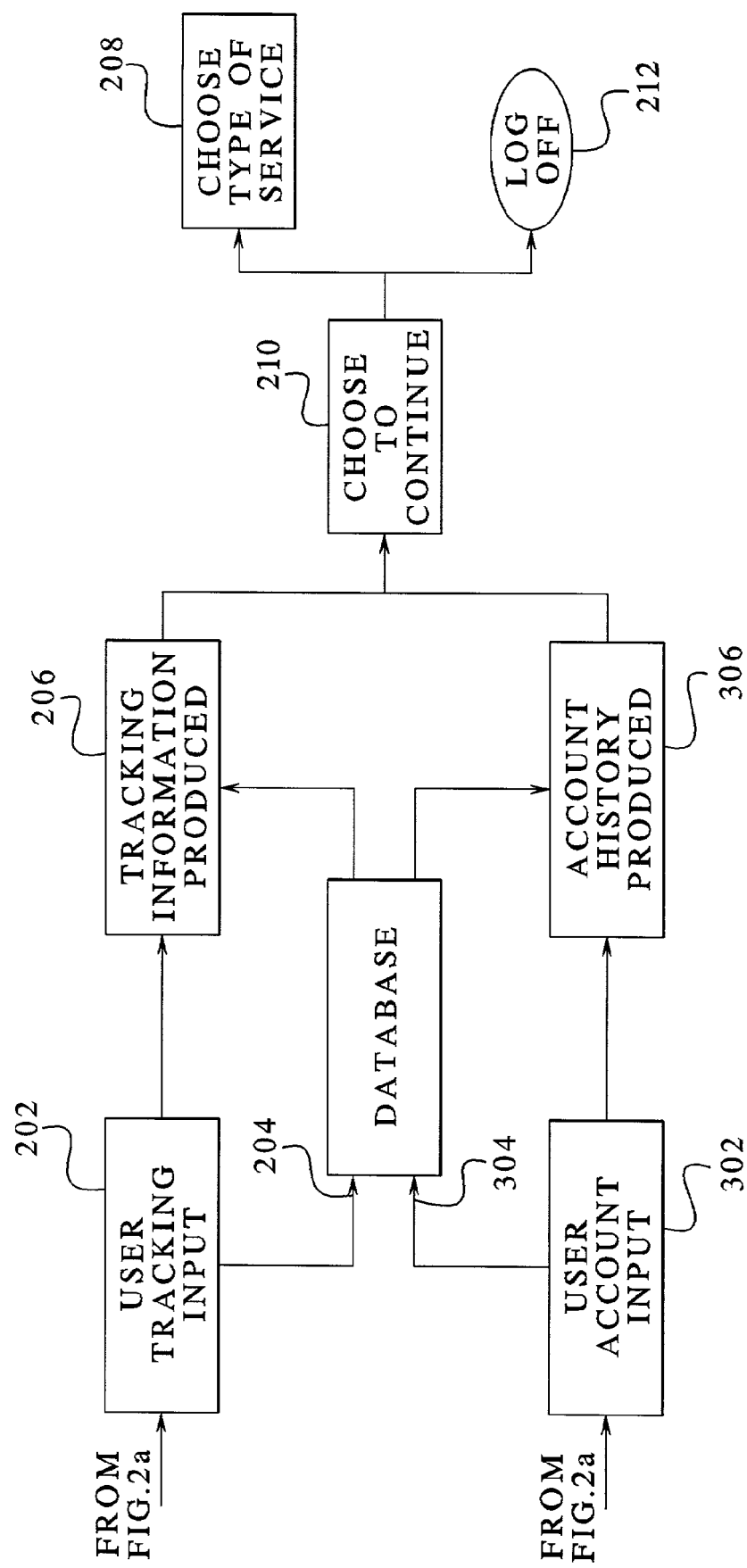

FIG. 2c illustrates a flowchart showing how the user 12 may access the website 14 and use the tracking features of the website 14 as shown at a "track a previous communication" step 112 or to "access account history" as shown at step 114. After the user 12 inputs "choose type of service" as shown at step 108 as discussed above, step 108 may allow the user 12 to choose to "create a communication" as shown at step 110, "track a previous communication" as shown at step 112, or "access account history" as shown at step 114.

If, for example, the user 12 chooses to "track a previous communication" as shown at step 112, the user 12 may proceed to input additional information as shown at "user tracking input" step 202. The tracking information may then be stored in the database 18 as shown at step 204. The website 14 may search the database 18 for tracking information based on information that was previously stored by the user 12 and/or the mail service provider 10. The processing unit 16 (shown in FIG. 1) may compile the information retrieved from the database 18 and present the sought-after tracking information to the user 12 as shown at "tracking information produced" step 206. The user 12 may proceed to "choose to continue" as shown at step 208. The user 12 may choose not to continue and "log off" as shown at step 212 or may choose to continue and return to "choose a type of service" as shown at step 210.

Alternatively, if the user 12 chooses to "access account history" as shown at step 114, the user 12 may proceed to input additional information as shown at "user account input" step 302. The input user account information may then be stored in the database 18 as shown at step 304. The website 14 may search the database 18 for account history based on information previously stored by the user 12. The processing unit 16 (shown in FIG. 1) may compile the information retrieved from the database 18 and present the sought after account history to the user 12 as shown at "account history produced" step 206.

The user 12 may proceed to "choose to continue" as shown at step 208. The user 12 may choose not to continue and "log off" as shown at step 212 or may choose to continue and return to "choose a type of service" as shown at step 210.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system to assist a user with preparation and mailing of a communication requiring delivery by a special service wherein the special service has fees associated with postage and services to effect the delivery by the special service, the system comprising:
a computer accessible site that automatically provides the preparation of the communication requiring the delivery by the special service and automatic payment of the fees associated with the postage and the services required to effect the delivery by the special service;
a computer for accessing the computer accessible site via a computer network; and
a database accessible by the computer via the computer network wherein the database is remotely located with respect to the computer wherein the database stores the communication, stores instructions to assist the user to complete the communication, stores criteria regarding selection of the special service appropriate for the delivery of the communication and stores requirements to effect the delivery of the communication by the special service wherein the communication in the database is selected via the computer and further wherein the communication is automatically prepared in compliance with the requirements of the delivery by the special service and further wherein the communication is automatically mailed by the special service via the computer accessible site.

2. The system of claim 1 further comprising:
means for inputting the information by the user.

3. The system of claim 1 further comprising:
a plurality of forms stored in the database.

4. The system of claim 1 further comprising:
a directory of addresses stored in the database.

5. The system of claim 1 further comprising:
means for generating addresses necessary for delivery based on the information input by the user.

6. The system of claim 1 further comprising:
means for generating the communication based on the information input by the user.

7. The system of claim 1 further comprising:
means for suggesting mailing requirements based on the information input by the user.

8. The system of claim 1 further comprising:
means for computing postage costs and fees to the user associated with the delivery by the special service.

9. The system of claim 1 further comprising:
means for contacting a supplier necessary to complete the delivery of the communication by the special service.

10. The system of claim 1 further comprising:
means for storing the information input by the user and communications generated for the user.

11. The system of claim 1 further comprising:
means for generating a report for the user.

12. A method for assisting with preparation and automatic mailing of a communication requiring delivery by a special service, the method comprising the steps of:
providing a computer-accessible site;
providing a database accessible by a user via the computer-accessible site wherein the database is remotely located with respect to the user wherein the database stores instructions to assist the user to complete the communication, stores criteria regarding selection of the special service appropriate for the delivery of the communication, stores requirements to effect the delivery of the communication by the special service, stores the communication, and stores a directory of mailing addresses wherein the directory of mailing addresses is accessed to confirm an address of a recipient of the communication;
inputting information into the database regarding demographics of the user via the computer-accessible site wherein the requirements to effect the delivery of the communication by the special service are based on the demographics of the user;
selecting the communication in the database via the computer-accessible site;
selecting a geographical region within which the communication is to be delivered;
preparing the communication according to selection of the geographical region;
automatically mailing the communication by the special service based on the requirements to effect the delivery of the communication by the special service;
generating fees, postage costs, and special service mail provider costs; and
automatically paying the fees.

13. The method of claim 12 further comprising the step of:
determining required services for the delivery by the special service and costs associated with the delivery.

14. The method of claim 12 further comprising the step of:
providing suggestions for complying with requests for delivery by the special service based on the demographics input by the user and the communication chosen by the user.

15. The method of claim 12 further comprising the step of:
generating the communication based on information input by the user.

16. The method of claim 12 further comprising the step of:
providing the communication to the user via a display screen.

17. The method of claim 12 further comprising the step of:
providing dates and times of steps taken by a special service mail provider in mailing the communication.

18. The method of claim 12 further comprising the step of:
generating a report of actions taken by a special service mail provider.

* * * * *